C. LOEFFELHARDT.
PLASTIC COMPOSITION AND PROCESS OF MAKING THE SAME.
APPLICATION FILED NOV. 22, 1919.

1,368,949. Patented Feb. 15, 1921.

INVENTOR.
CHARLES LOEFFELHARDT
BY
ATTORNEYS

UNITED STATES PATENT OFFICE.

CHARLES LOEFFELHARDT, OF LOS ANGELES, CALIFORNIA.

PLASTIC COMPOSITION AND PROCESS OF MAKING THE SAME.

1,368,949.  Specification of Letters Patent.  Patented Feb. 15, 1921.

Application filed November 22, 1919. Serial No. 339,973.

*To all whom it may concern:*

Be it known that I, CHARLES LOEFFELHARDT, a citizen of Germany, residing at Los Angeles, in the county of Los Angeles and State of California, have invented new and useful Improvements in Plastic Compositions and Processes of Making the Same, of which the following is a specification.

This invention relates to compositions of matter and more particularly to a composition and method for producing stone-like bodies, and has for its object to provide a method and a composition produced thereby that can be used in substitution for floor and wall covering where wood of the more expensive qualities has heretofore been used; and the invention consists of the method and the product thereof as hereinafter described and claimed.

Figure 1:
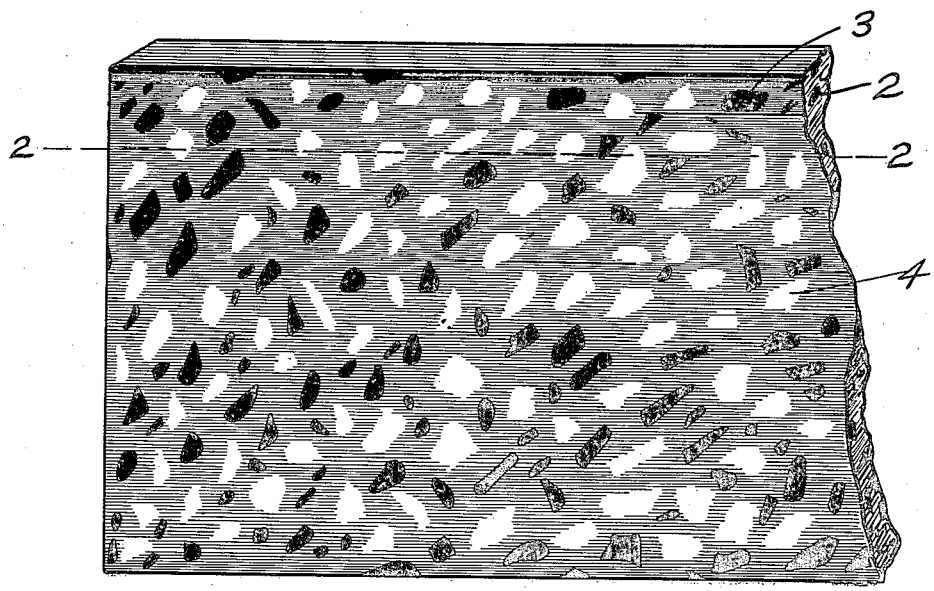
Figure 1 is a perspective of a fragment of the slab.
Figure 2:
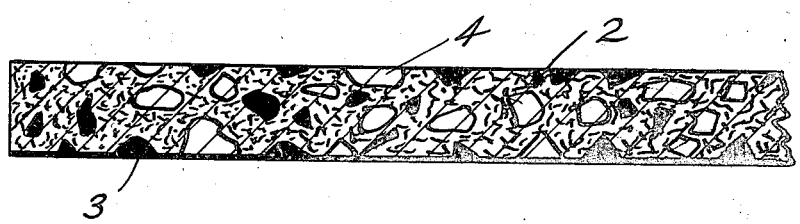
Fig. 2 is a section on line 2—2 of Fig. 1.

In the practice of the method a mixture of plaster in one batch is prepared by the use of calcined magnesite (MgO), preferably, in one part to one part consisting of a filler such as ground wood, talcum powder, marble dust, silica dust and the like and thoroughly mixing the same with a moistening solution of magnesium chlorid ($MgCl_2$); the solution preferably being about 22%. The whole is mixed to the consistency of a thick fluid or of such fluidity as to permit the escape or removal of the air or gas bubbles contained in the batch as it is desirable that the product be free from air bubbles or interstices. The mass thus prepared is dried, crushed and then assorted according to sizes by screening to produce pebble-like particles or pieces which when made of the above described composition are substantially white.

If it is desired to produce pebble-like pieces of any desired tint or shade, a suitable coloring agent is introduced into the batch while it is being thoroughly mixed and such coloring agent as graphite, lamp black, or other suitable matter may be utilized in the desired preparations according to the shade to be produced.

A plaster is separately prepared consisting, preferably, in one part of calcined magnesite (MgO) and, preferably, one part comprising a filler such as talcum powder, marble dust, silica and the like moistened with a magnesium chlorid ($MgCl_2$) solution of about 22%, the whole being thoroughly mixed and with or without a coloring matter as above described such as graphite, lamp black, etc.

The pebble-like particles from the previously hardened batch or batches are then mixed with this plaster to form a mortar which is applied in a manner according to the product to be produced as by the application through means of a trowel when it is to be utilized as a wall or ceiling covering or flooring. The applied mortar is then permitted to harden and the rough surface is smoothed down to the desired degree.

The product resulting from the above steps therefore consists of a cementitious mass the conglomerate or pebble-like pieces of which will show in contrasting tints or shades relative to the bonding plaster in which they are embedded when the whole is dressed down.

The composition produced as above described is illustrated in the accompanying drawings in which the plaster mass is indicated at 2 and the darker shaded pebbles 3 are those produced by the mixture of lamp black as a coloring agent while the white pebbles 4 are those produced by the mixture of the ingredients with the use of a coloring medium. The plaster itself may be made of a gray tint as is indicated by the stippling as by the introduction of a smaller quantity of lamp black or of graphite.

The air content may be removed from the plastic masses as they are prepared in the manner above defined by shaking the containers with the masses to enable the air bubbles to rise and escape, or the removal may be accomplished in any other suitable manner.

Various changes may be made without departing from the spirit of my invention as claimed.

I claim:

1. An artificial stone consisting of assorted concretions composed of calcined magnesite and a filler bonded by magnesium chlorid; embedded in a cement formed of calcined magnesium, an inert filler, and magnesium chlorid solution.

2. An artificial stone consisting of assorted concretions composed of calcined magnesite and a filler bonded by magnesium chlorid; embedded in a cement formed of calcined magnesium, an inert filler, and magnesium chlorid solution, the concretions and the plaster being of contrasting color, 3. The method of producing a stone-like composition, wherein calcined magnesite, a filler, and magnesium chlorid are mixed to a thick fluid consistency and then shaken so as to eliminate air or gas bubbles, then dried, crushed and screened to assorted sizes and mixed with the pieces of a cement consisting of calcined magnesite, a filler, and magnesium chlorid.

4. The method of producing a stone-like composition, wherein calcined magnesite, a filler, and magnesium chlorid are mixed to a thick fluid consistency and then shaken so as to eliminate air or gas bubbles, then dried, crushed and screened to assorted sizes and mixed with the pieces of a cement consisting of calcined magnesite, a filler, and magnesium chlorid and introducing into either batch while it is being mixed a coloring agent so that contrasting shades will be produced when the set composition is dressed smoothed.

5. The method of producing a stone-like composition, wherein different batches of calcined magnesite, a filler, and magnesium chlorid are prepared separately; introducing into a given patch or batches a coloring agent to produce contrasts; removing the free air content from the batches; then drying and crushing the batches, and the fragments assorting; and then making a cement of substantially the same substances and mixing therewith the assorted particles and applying to form a layer or other body.

In testimony whereof I have signed my name to this specification.

CHAS. LOEFFELHARDT.